US006726056B2

(12) United States Patent
Yuyama et al.

(10) Patent No.: US 6,726,056 B2
(45) Date of Patent: Apr. 27, 2004

(54) MEDICINE FEED APPARATUS

(75) Inventors: Shoji Yuyama, Toyonaka (JP); Toshihiro Amatsu, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 49 days.

(21) Appl. No.: 10/124,376

(22) Filed: Apr. 18, 2002

(65) Prior Publication Data

US 2002/0152717 A1 Oct. 24, 2002

(30) Foreign Application Priority Data

Apr. 19, 2001 (JP) ....................................... 2001-121250

(51) Int. Cl.[7] ................................................ B65G 59/00

(52) U.S. Cl. ........................ 221/124; 221/130; 221/131; 221/133; 221/253

(58) Field of Search ................................ 221/124, 127, 221/130, 131, 133, 221, 253; 312/266, 267, 268, 97

(56) References Cited

U.S. PATENT DOCUMENTS 5,431,299 A * 7/1995 Brewer et al. ................. 221/2
5,667,096 A * 9/1997 Wu ............................... 221/6
6,006,947 A 12/1999 Kano
6,012,602 A * 1/2000 Yuyama et al. ............. 221/130

FOREIGN PATENT DOCUMENTS

| | | | | |
|---|---|---|---|---|
| EP | 1 053 738 | | 11/2000 | |
| JP | 54043099 A | * | 4/1979 | ............. G07F/5/18 |
| JP | 04077893 A | * | 3/1992 | ........... G07F/11/58 |
| JP | 04348493 A | * | 12/1992 | ........... G07F/11/58 |
| JP | 7-52901 | | 2/1995 | |

* cited by examiner

*Primary Examiner*—Donald P. Walsh
*Assistant Examiner*—Kaitlin Joerger
(74) *Attorney, Agent, or Firm*—Wenderoth, Lind & Ponack L.L.P.

(57) ABSTRACT

A drawer 2*c* is provided with a collecting mechanism 20 for collecting medicines discharged from the storage containers 3. The body frame 1 is provided with a recovery box 28 for recovering medicines collected by the collecting mechanism 20. The collecting mechanism 20 has a first passage and a second passage which can be used interchangeably. The first passage allows the medicines discharged from the storage containers 3 to be conveyed to the recovery box 28, when the drawers 2*c* are contained in the body frame 1, while the second passage allows the medicines discharged from the storage containers 3 to be conveyed to the recovery box 28 when the drawers 2*c* are drawn out of the body frame 1.

11 Claims, 8 Drawing Sheets

(a)

(b)

MEDICINE FEED APPARATUS

BACKGROUND OF THE INVENTION

The present invention relates to a medicine feed apparatus.

A conventional medicine feed apparatus comprises a body frame, a few drawers drawably contained in the body frame and a plurality of storage containers in which different kinds of medicines are stored and which are attached on each of the drawers.

A another type of medicine feed apparatus comprises a drum and a plurality of storage containers which are attached on the peripheral surface of the drum and from which medicines are fed (refer to Japanese Laid-open patent publication No. H7-52901).

In the former, there has been a disadvantage that a medicine feed process is interrupted when drawing the drawer to replenish the medicine.

In the latter, the problem of interruption of the medicine feed process, as in the former, is eliminated but there has been a disadvantage that the space that the apparatus occupies is larger.

SUMMARY OF THE INVENTION

The present invention has been developed to substantially eliminate the above-described disadvantages.

It is therefore an object of the present invention to provide the medicine feed apparatus which can conduct a replenishing work of the medicines without interrupting the medicine feed process and which occupies a small space.

In order to attain the aforementioned objects, there is provided a medicine feed apparatus comprising a body frame, a few drawers drawably contained in the body frame and a plurality of storage containers attached on each of the drawers so that medicines stored in the storage containers are fed in accordance with prescription data.

The drawer is provided with a collecting mechanism for collecting the medicines discharged from the storage containers.

The body frame is provided with a recovery box for recovering the medicines collected by the collecting mechanism.

Also, the collecting mechanism has a first passage and a second passage which are interchangeable. The first passage allows the medicines discharged from the storage containers to be conveyed to the recovery box in a state that the drawers are contained in the body frame, while the second passage allows the medicines discharged from the storage containers to be conveyed to the recovery box in a state that the drawers are drawn out of the body frame.

According to the aforementioned construction of the present invention, in an ordinary operation, i.e., in the state that the drawers are contained in the body frame, the medicines corresponding to the prescription data are discharged from the storage container to the collecting mechanism and recovered to the recovery box through the first passage. In the state that the drawers are drawn out of the body frame, the medicines corresponding to the prescription data are discharged from the storage container to the collecting mechanism and recovered to the recovery box through the second passage. Thus, the medicine feed apparatus of the present invention can conduct a replenishing work of the medicines without interrupting the medicine feed process. The plurality of storage containers can be attached on the drawers contained in the body frame, and thus the medicine feed apparatus of the present invention can occupy a small space.

Preferably, the collecting mechanism may comprise a conveying member having a retractable end and the recovery box may be disposed under the retractable end of the conveying member so that the first passage can be formed by retracting the retractable end of the conveying member to convey the medicine to the recovery box through the retractable end of the conveying member, while the second passage can be formed by extending the retractable end of the conveying member to convey the medicine to the recovery box through the opposite end to the retractable end of the conveying member.

The recovery box may be replaced with a packing unit for packing the medicine collected by the collecting mechanism. Alternatively, the recovery box may be followed by a packing unit for packing the medicine collected by the collecting mechanism.

The plurality of storage containers may be disposed in a vertical direction and the collecting mechanism may be ascendable and descendable, i.e. movable up and down, so that it can collect the medicines discharged from any of the storage containers disposed in the vertical direction.

BRIEF DESCRIPTION OF THE DRAWINGS

Further objects and advantages of the present invention will become clear from the following description taken in conjunction with the preferred embodiments thereof with reference to the accompanying drawings, in which.

DETAILED DESCRIPTION OF THE PREFERRED EMBODIMENTS

Figure 1:
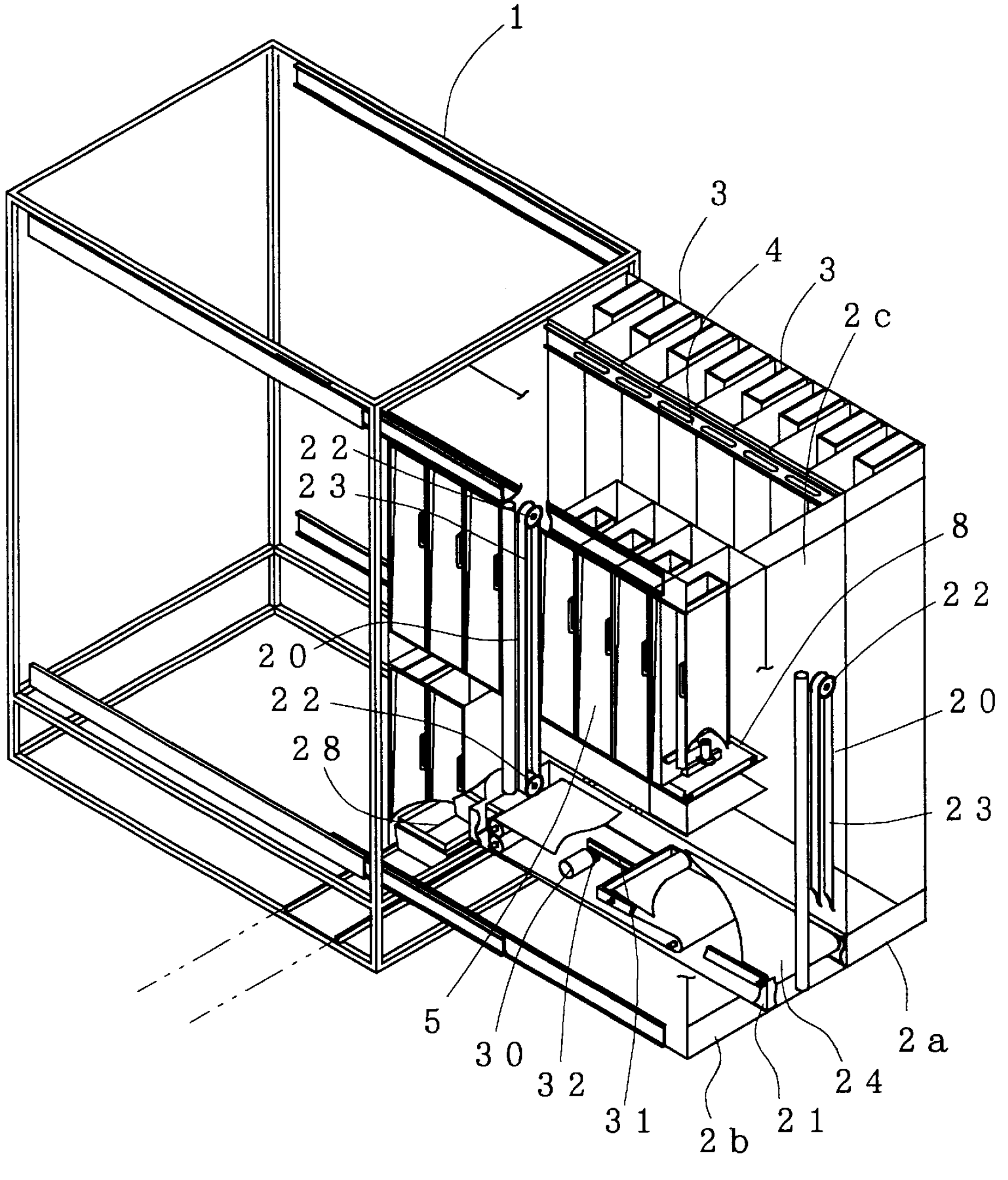
FIG. 1 is a perspective view of a medicine feed apparatus according to an embodiment of the present invention.

FIG. 1 shows a medicine feed apparatus according to an embodiment of the present invention. Inside a body frame 1 of the medicine feed apparatus, three drawers 2*a*, 2*b* and 2*c* are contained.

Figure 2:
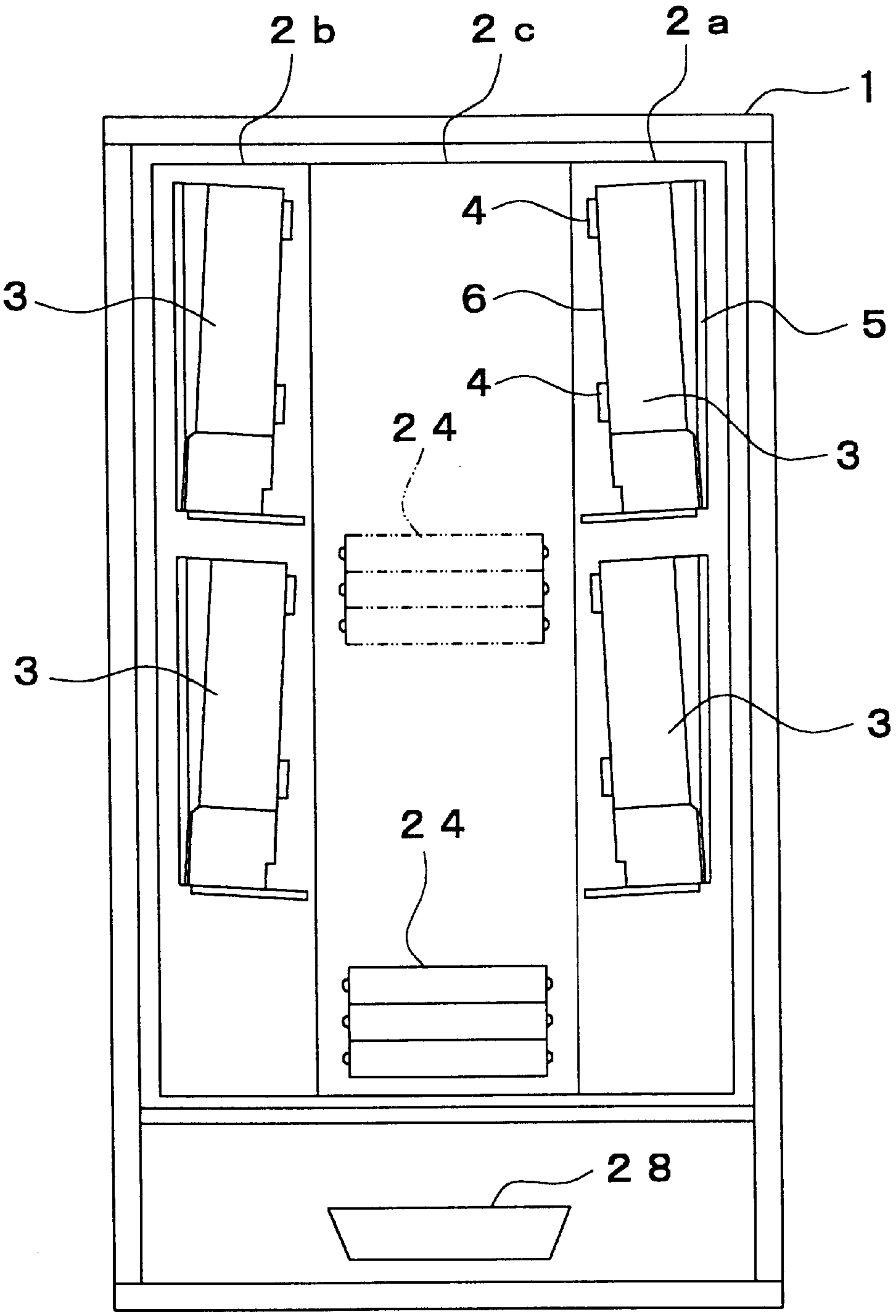
FIG. 2 is a front view of the medicine feed apparatus of FIG. 1.

On the upper and lower stages of each of the drawers 2*a*, 2*b* positioned on both sides, as shown in FIG. 2, a plurality of storage containers 3 are attached with the rear wall thereof screwed to two horizontal beams 4. Screwing is performed by inserting bolts into slits (not shown) formed in the horizontal beams 4 along a longitudinal direction. Thus, the storage container 3 can be attached to a desired position. An attaching space is not restricted even for the storage container 3 having a different width. Therefore, in any medical institutes treating a different kind of and a different quantity of medicines, the medicine feed apparatus of the present invention can be used by selecting the kinds of storage containers 3 to be attached.

Figure 3:
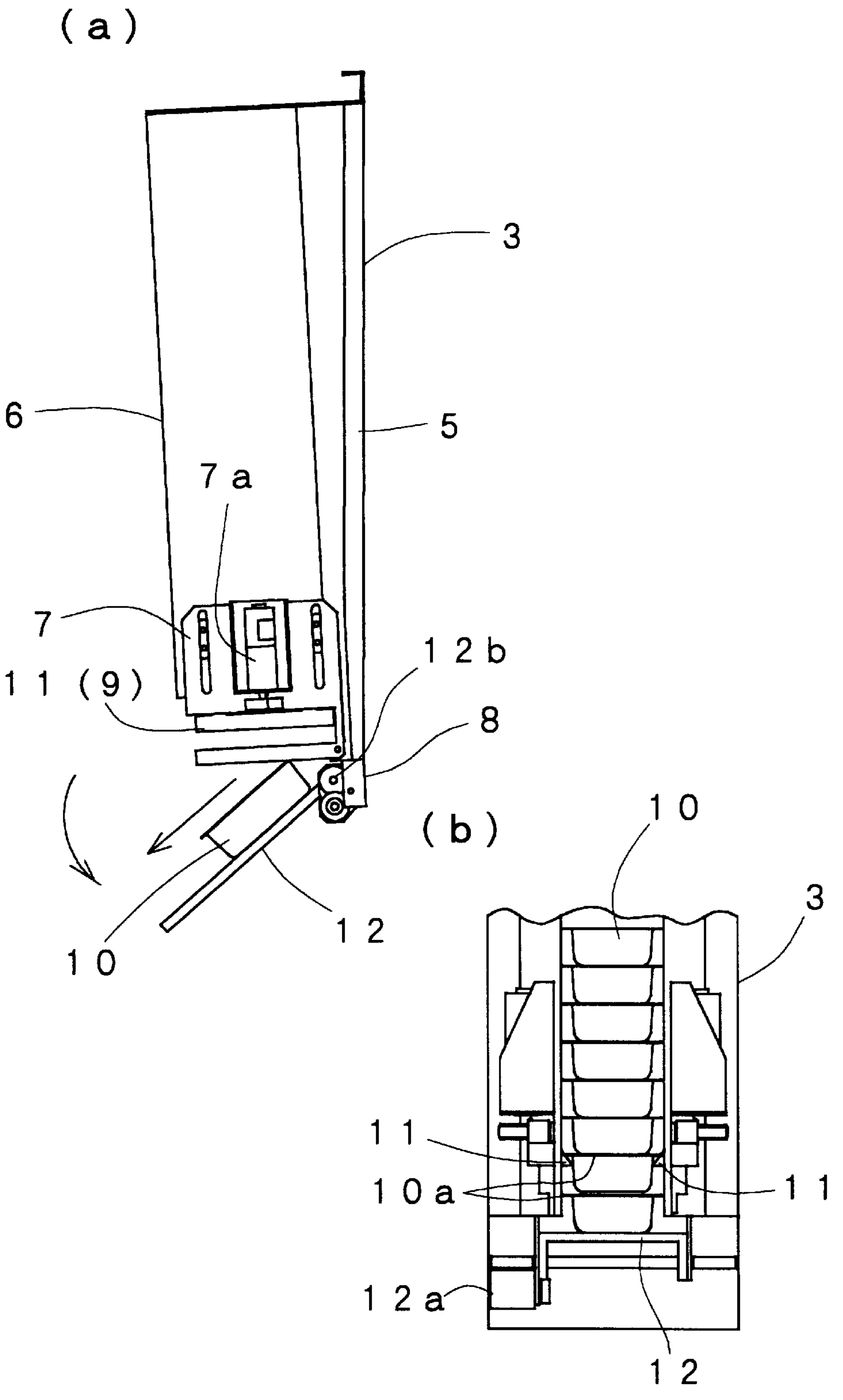
FIG. 3(*a*) is a side view of an example of a storage container of the medicine feed apparatus of FIG. 1 and FIG. 3(*b*) is a partial front view of the storage container of FIG. 3(*a*) with the door opened.
Figure 4:
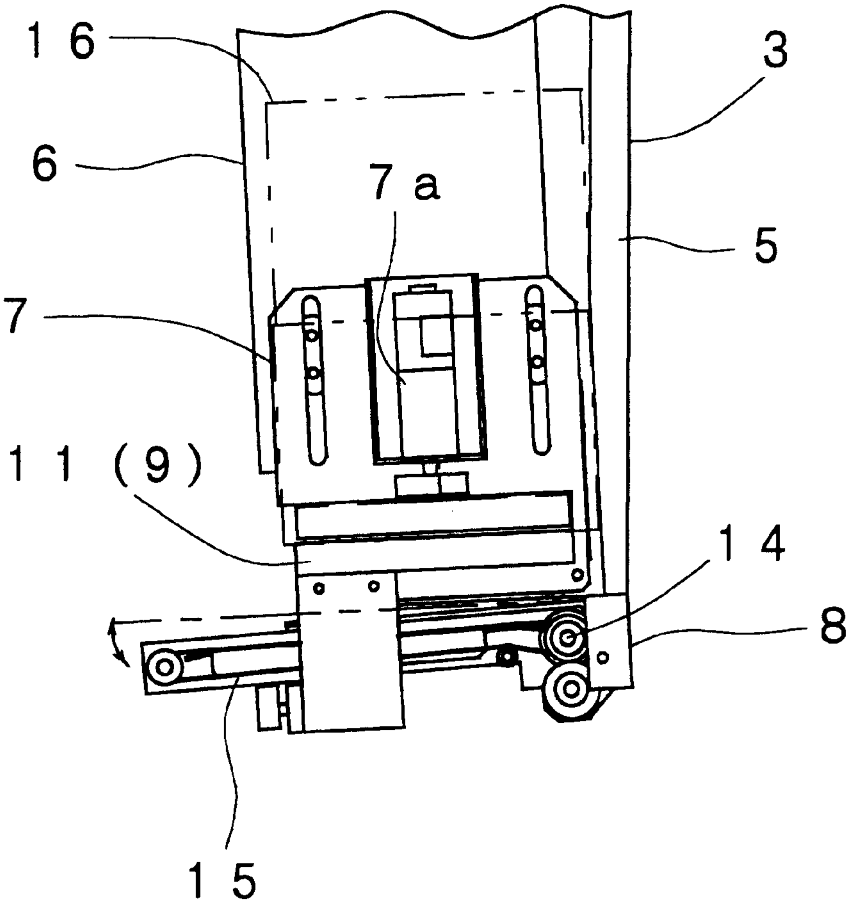
FIG. 4 is a partial side view of an example of a storage container of the medicine feed apparatus of FIG. 1.
Figure 5:
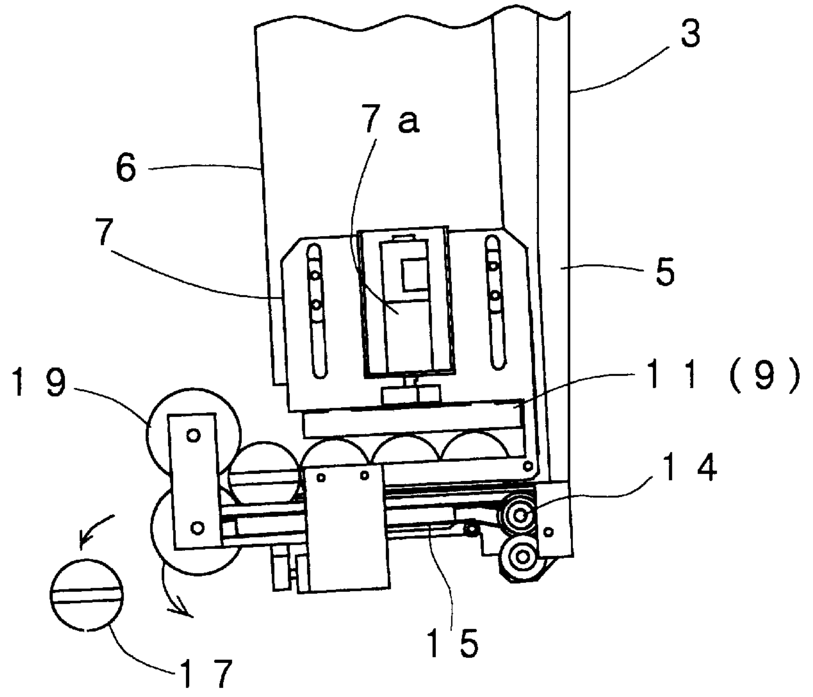
FIG. 5(*a*) is a partial side view of an example of a storage container of the medicine feed apparatus of FIG. 1, and FIG. 5(*b*) is a partial perspective view of FIG. 5(*a*)
Figure 5:
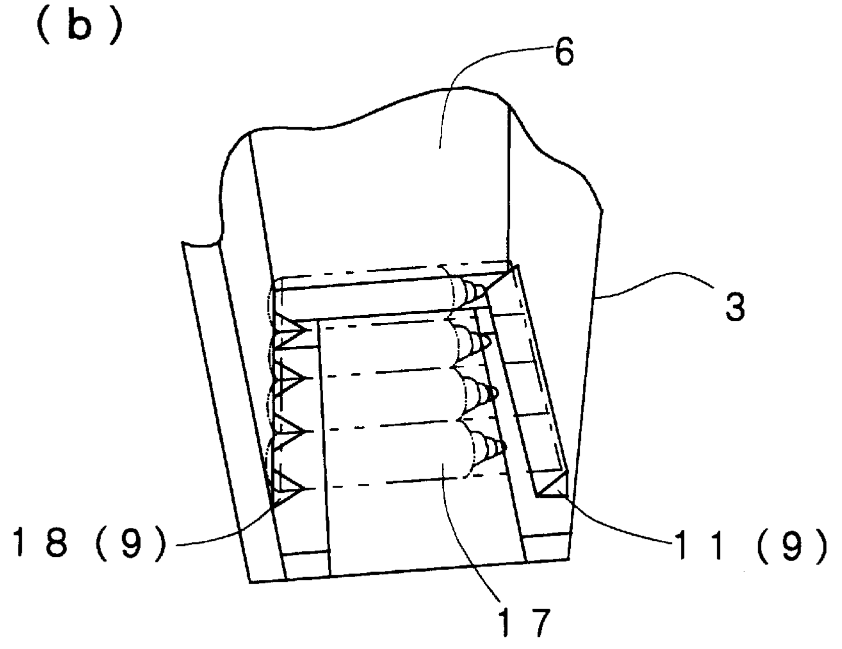

Three kinds of the storage containers 3 containing different kinds of medicines are provided as shown in FIGS. 3 to 5. Each storage container 3 has a door 5 in the front surface thereof and has a structure that makes it possible to stack the medicines in a vertical direction. The back side surface of the storage container 3 is tilted toward the back thereof. Thus, the stacked medicines are leaned backward, preventing the medicines from being dropped off when the door 5 is opened. In the lower part of the storage container 3, a retaining mechanism 7 and a discharge mechanism 8 are provided. The retaining mechanism 7 is so constructed that retaining portions 9 are protruded from and retracted into the opposite side surfaces by driving a motor 7*a*. The discharge mechanism 8 is disposed at the bottom of the storage container 3 and so constructed that the lowermost medicine can be discharged in a lateral direction. The medicine to be discharged by the discharged mechanism 8 is detected by a sensor (not shown).

Figure 6:
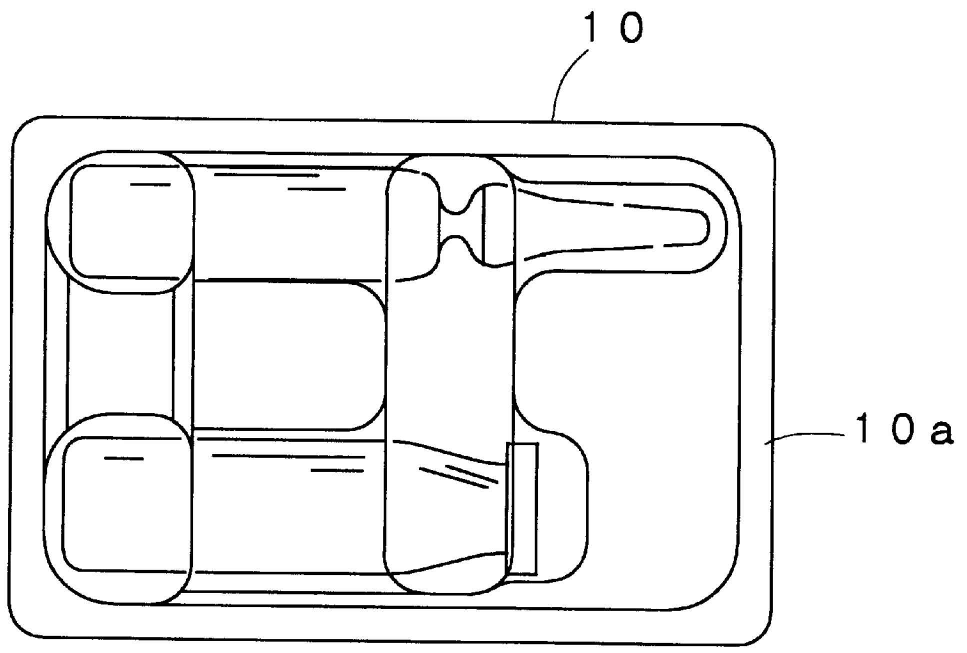
FIG. 6 is a plan view of an example of a medicine package stored in the storage container of FIG. 3.

The storage container 3, as shown in FIG. 3, is suitable for discharging a blister pack 10 as shown in FIG. 6. The retaining portion 9 of the retaining mechanism 7 comprises protrusions 11 which protrude between the sheet stuck surfaces 11*a* of the lowermost and second lowermost stacked blister packs 10 to support the second blister pack 10 with the upper blister packs 10 stacked thereon. The discharge mechanism 8 comprises a chute 12 which can be tilted downward around a support shaft 12*b* by about 45 degrees by driving a motor 12*a*.

Figure 7:
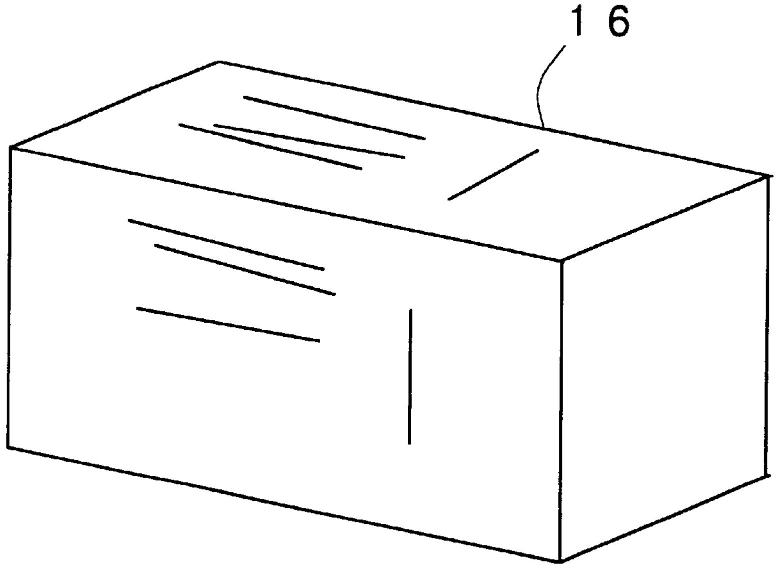
FIG. 7 is a perspective view of an example of medicine package stored in the storage container of FIG. 4.

The storage container 3, as shown in FIG. 4, is suitable for discharging a boxed medicine as shown in FIG. 7. The retaining portion 9 of the retaining mechanism 7 comprises, in the same manner as that of FIG. 3, protrusions 11 which can support the both side portions of the bottom of the second medicine box 16 with the upper medicine boxes 16 stacked thereon. The discharge mechanism 8 comprises a conveyor belt 15 which can be tilted downward around a support shaft 14. The discharge mechanism 8 conveys the lowermost medicine box 16 via the conveyor belt 15 by a predetermined distance and standbys in a state that the protrusions 11 hold the second and upper stacked medicine boxes 16.

Figure 8:
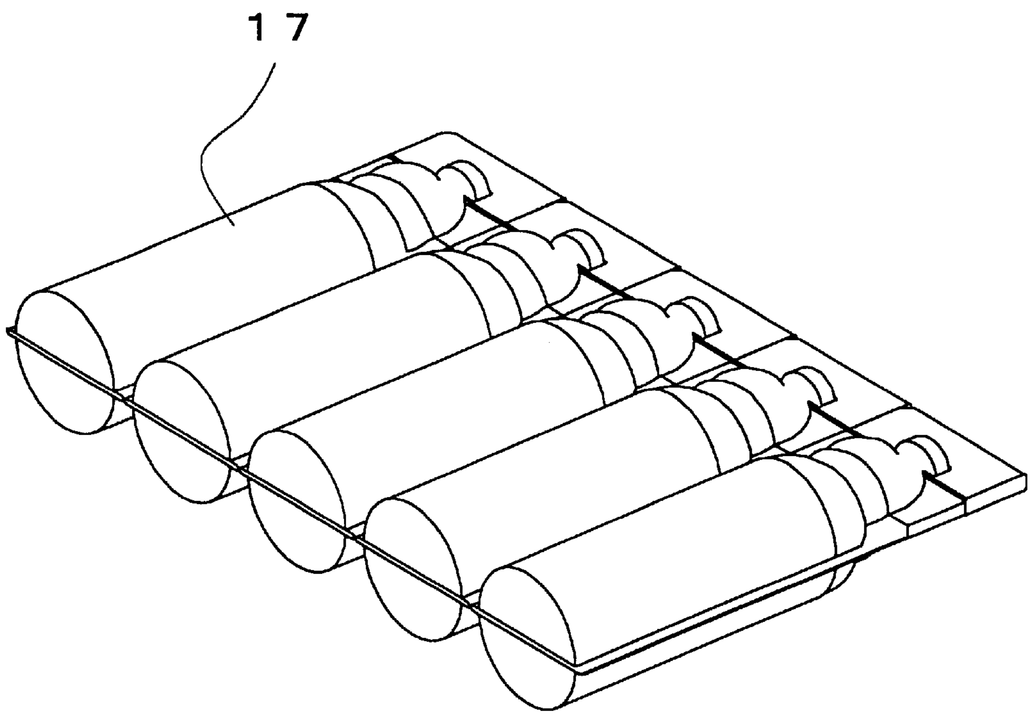
FIG. 8 is a perspective view of an example of a medicine package stored in the storage container of FIG. 5.

The storage container 3, as shown in FIG. 5, is suitable for cutting respective ampoules from a set of multi-connected (five-connected in the example) plastic ampoules 17 as shown in FIG. 8 and discharging them. The retaining portion 9 of the retaining mechanism 7 comprises a plurality of claws 18 which are positioned between the respective ampoules and can support the bottom ends of the respective ampoules of the set of the plastic ampoules 17 and a protrusion 11 which can support the top end of the set of the plastic ampoules 17. Thus, even the ampoules 17 that are already cut can be contained in the storage container 3. The discharge mechanism 8 comprises a conveyor belt 15 in the same manner as that of FIG. 4. On the tip end of the conveyor belt 15 is provided a cutting rotor 19 (refer to Japanese Patent Laid-open Publication No. H8-243146) as a means for cutting the respective ampoules of the set of plastic ampoules 17 one by one.

In the storage container 3, as shown in FIGS. 3 and 4, the conveyor belt 15 can actively discharge the medicine, reducing the tilt angle thereof. Therefore, a vertical space occupied by the storage container 3 becomes smaller. Thus, it is possible to dispose many storage containers 3 in a vertical direction, enabling high accumulation of the storage containers 3. This effect is exerted especially in the storage container 3 containing the boxed medicine.

Figure 9:
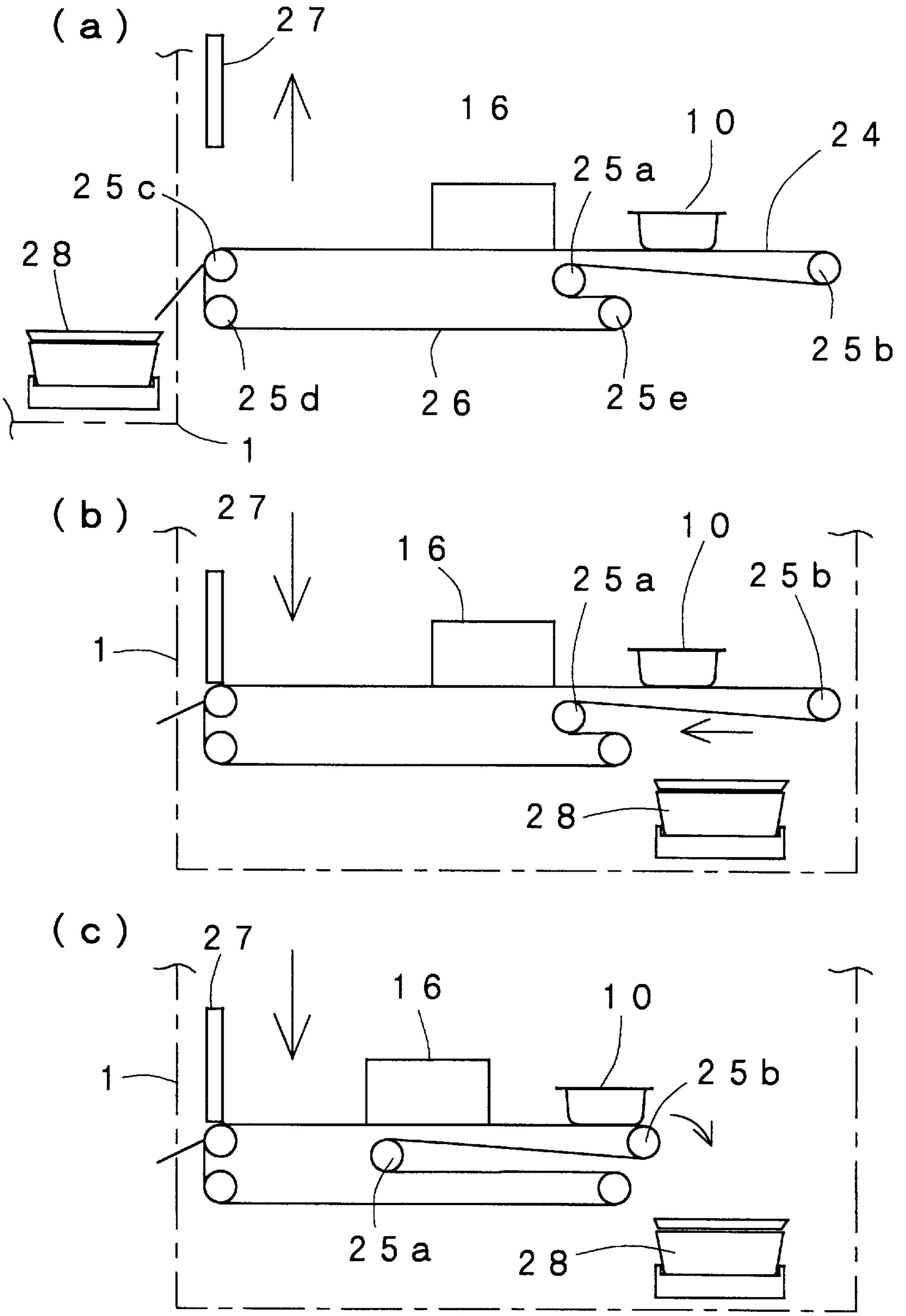
FIGS. 9(*a*) to 9(*c*) are diagrammatic views showing an operation of the belt conveyor of the medicine feed apparatus of FIG. 1.

On the middle drawer 2*c*, a frame 21 which is ascended and descended by a lifter 20 is provided. The lifter 20 comprises timing belts 23 each of which moves on two rollers 22 disposed on the drawer 2*c* in a vertical direction. A portion of each of the timing belts 23 is fixed on the frame 21. The bottom of the frame 21 comprises a belt conveyor 24 which functions as a collecting mechanism according to the present invention. The belt conveyor 24 comprises a belt 26 which can move on five pulleys 25*a*, 25*b*, 25*c*, 25*d* and 25*e* as shown in FIG. 9. Driving a motor not shown to rotate the pulley 25d forwardly or reversely causes the belt 26 to be circulated, allowing the medicine put on the belt 26 to be conveyed in back and forth directions. The pulleys 25*a* and 25*b* can be moved in back and forth directions by means of a rack 31 and a pinion 32 fixed on a rotation axis of a motor 30 so that the front end (referred to as a retractable end) of the belt 26 can be retracted or extended. Above the rear end of the belt 26, a shutter 27 which can be opened and closed in a vertical direction is disposed.

On the bottom and the front side of the body frame 1, there is provided a recovery box 28 which is positioned beneath the retractable end of the belt conveyor 24. The recovery box 28 is put on rails which are disposed so as to pass through the body frame 1.

The drawers 2*a*, 2*b* and 2*c* are normally integrated by a linkage member so that they are integrally drawn from and contained in the body frame 1. At the time of maintenance, the linkage member is disengaged, only the central drawer 2*c* can be drawn from and contained in the body frame 1.

Instead of the recovery box 28, alternatively at a position where the medicines are fed from the recovery box 28, a packing apparatus may be provided so that the medicines can be packed in a bag.

Operation of the aforementioned medicine feed apparatus will be explained.

Receiving a prescription data, the storage container 3 in which the medicines corresponding to the prescription data are contained is specified. Then, it is decided at which stage the storage container 3 is positioned, the lower stage or the upper stage. If the storage container 3 is positioned at the lower stage, then the belt conveyor 24 remains as it is. If the storage container 3 is positioned at the upper stage, then the lifter 20 is driven to ascend the belt conveyor 24. Subsequently, the discharge mechanism 8 is driven to discharge the lowermost medicine. The discharged medicine is placed on the belt 26 of the belt conveyor 24. When the discharge of the medicine is detected by the sensor, the belt conveyor 24 is driven to shift the position where the medicine is discharged. Therefore, the medicine corresponding to the next data is smoothly discharged without being obstructed by the medicine on the belt conveyor 26. The above mentioned operation is repeated until the number of medicines reaches the predetermined number specified by-the prescription data.

When the predetermined number of medicines have been discharged onto the belt conveyor 24, if the belt conveyor 24 is positioned at the lower stage, then the belt conveyor 24 remains as it is, while if the belt conveyor 24 is positioned at the upper stage, then the belt conveyor 24 is once ascended. Subsequently, as shown in FIG. 9(*b*), the belt conveyor 24 is driven in a forward direction and the pulleys 25*a* and 25*b* are moved so that the retractable end of the belt conveyor 24 is retracted. Thus, as shown in FIG. 9(*b*), the recovery box 28 is revealed so that the first passage is formed. The medicines on the belt 26 are recovered through the retractable end into the recovery box 28 one after another. When all of the medicines on the belt 26 have been recovered into the recovery box 28, the pulleys 25*a* and 25*b* are returned to the original position and the operation of the belt conveyor 24 is stopped. The recovery box 28 are moved on the rails and conveyed to a feed place to feed the medicines.

In the case that any of medicines become depleted, the drawers 2*a*, 2*b* and 2*c* are drawn from the frame body 1. Then, the door 5 of the depleted storage container 3 is opened to replenish it with the medicines. In this case, as shown in FIG. 9(*a*), the recovery box 28 is positioned at another end of the belt conveyor 24 opposite to the retractable end so that the second passage is formed. Therefore, even during the replenishing work, the medicines can be discharged onto the belt conveyor 24 from the storage container 3 based on the prescription data. Then, the belt conveyor 24 is driven in a reverse direction and shutter 27 is opened so that the medicines are delivered to the recovery box 28 through the opposite end with respect to the retractable end. If drawing of the drawers 2*a*, 2*b* and 2*c* are carried out during the conveyance of the medicines on the belt conveyor 24, the operation of the belt conveyor 24 is stopped. Then, the belt conveyor 24 is driven again after the drawers 2*a*, 2*b* and 2*c* have been completely drawn from the body frame 1.

Thus, according to the construction of the belt conveyor 24, even when the drawers 2*a*, 2*b* and 2*c* are drawn, the medicines on the belt 26 can be delivered to the recovery box 28, thereby enhancing the work efficiency.

The construction of the storage container 3 adopted in the medicine feed apparatus may be applied to a medicine dispenser apparatus such as a medicine packing apparatus, an ampoule containing and feed apparatus, transfusion bottle feed apparatus and so on.

In the aforementioned embodiment, the recovery box 28 is used as a recovery means but a further conveyor mechanism may be provided between the belt conveyor 24 and the recovery box 28 and the recovery box 28 may be replaced with a packing unit or another member.

Although the present invention has been fully described by way of the examples with reference to the accompanying drawings, it is to be noted that various changes and modifications will be apparent to those skilled in the art. Therefore, unless such changes and modifications otherwise depart from the spirit and scope of the present invention, they should be construed as being included therein.

What is claimed is:

1. A medicine feed apparatus comprising a body frame, a plurality of drawers drawably contained in the body frame and a plurality of storage containers attached on each of the drawers so that medicines stored in the storage containers are fed in accordance with a prescription data, wherein;

the drawers are provided with a collecting mechanism for collecting the medicines discharged from the storage containers;

the body frame is provided with a recovery box for recovering the medicines collected by the collecting mechanism; and the collecting mechanism has a first passage and a second passage which can be used alternatively to convey the medicines discharged from the storage containers to the recovery box, the first passage allowing the medicines discharged from the storage containers to be conveyed to the recovery box in a state that the drawers are contained in the body frame, while the second passage allowing the medicines discharged from the storage containers to be conveyed to the recovery box in a state that the drawers are drawn out of the body frame.

2. A medicine feed apparatus as claimed in claim 1, wherein the collecting mechanism comprises a conveying member having a retractable end and the recovery box is disposed under the retractable end of the conveying member so that the first passage can be formed by retracting the retractable end of the conveying member to convey the medicine to the recovery box through the retractable end of the conveying member, while the second passage can be formed by extending the retractable end of the conveying member to convey the medicine to the recovery box through the opposite end to the retractable end of the conveying member.

3. A medicine feed apparatus as claimed in claim 1, wherein the recovery box is followed by a packing unit for packing the medicine collected by the collecting mechanism.

4. A medicine feed apparatus as claimed in claim 1, wherein the plurality of storage containers are disposed in a vertical direction and the collecting mechanism is ascendable and descendable so that it can collect the medicines discharged from any of the storage containers disposed in the vertical direction.

5. A medicine feed apparatus as claimed in claim 1, wherein the collecting mechanism comprises a belt conveyor, and the first and second passages are defined by opposite ends of the belt conveyor, respectively.

6. A medicine feed apparatus as claimed in claim 1, further comprising a shutter disposed in the vicinity of the second passage.

7. A medicine feed apparatus comprising:

a body frame;

a plurality of drawers drawably contained in the body frame;

a plurality of medicine storage containers attached to each of the drawers so that medicines stored in the storage containers can be dispensed in accordance with prescription data;

a collecting mechanism, disposed in the vicinity of the drawers, for collecting the medicine discharged from the storage containers; and a packing unit for packing the medicine collected by the collecting mechanism, wherein the collecting mechanism has a first passage and a second passage which can be selectively used to convey the collected medicine to the packing unit, and wherein the first passage allows the collected medicine to be conveyed to the packing unit when the drawers are contained in the body frame, and the second passage allows the collected medicine to be conveyed to the packing unit when the drawers have been drawn out of the body frame.

8. A medicine feed apparatus as claimed in claim 7 wherein the plurality of storage containers are disposed in a vertical direction and the collecting mechanism is movable upwardly and downwardly so that the collecting mechanism can collect the medicine discharged from any of the storage containers disposed in the vertical direction.

9. A medicine feed apparatus as claimed in claim 7, wherein the collecting mechanism comprises a belt conveyor, and the first and second passages are defined by opposite ends of the belt conveyor, respectively.

10. A medicine feed apparatus as claimed in claim 7, wherein the collecting mechanism comprises a conveyor having first and second ends which define the first and second passages, respectively, and the first end of the conveyor is retractable to permit positioning of the first passage relative to the packing unit.

11. A medicine feed apparatus as claimed in claim 7, further comprising a shutter disposed in the vicinity of the second passage.

* * * * *